United States Patent [19]

Waldman

[11] Patent Number: 4,670,900
[45] Date of Patent: Jun. 2, 1987

[54] SINGLE LINE TELEPHONE CALL FORWARDING DEVICE

[76] Inventor: Herbert H. Waldman, 1739 52nd St., Brooklyn, N.Y. 11204

[21] Appl. No.: 724,065

[22] Filed: Apr. 17, 1985

[51] Int. Cl.[4] .................... H04M 1/272; H04M 3/54
[52] U.S. Cl. .................................. 379/211; 379/387
[58] Field of Search ............ 179/90 B, 90 BD, 18 BE

[56] References Cited

U.S. PATENT DOCUMENTS 4,413,158 11/1983 Danford .......................... 179/90 BD
4,475,009 10/1984 Rais et al. ....................... 179/90 BD Primary Examiner—James L. Dwyer
Attorney, Agent, or Firm—Louis Orenbuch

[57] ABSTRACT

A device for enabling call forwarding instructions to be given from any telephone in the system or in any connecting system need be connected only to the phone line for which call forwarding service is provided and does not require another phone line to communicate with the device. The device employs a ring detector to detect the short ring that occurs when a call is forwarded and to detect the long ring that occurs when call forwarding is not in effect. Upon the detection of one or more short rings, the device seizes the phone line, transmits a "73" signal that cancels call forwarding, and triggers a timer that starts upon a timing interval of preset duration. If another phone call is received at the device within the preset timing interval and an authorization code is transmitted within that interval, the device enables the call forwarding instructions stored in a recorder to be changed. Thereafter, the device will twice transmit the stored call forwarding instructions to the central station within a two minute period.

7 Claims, 2 Drawing Figures

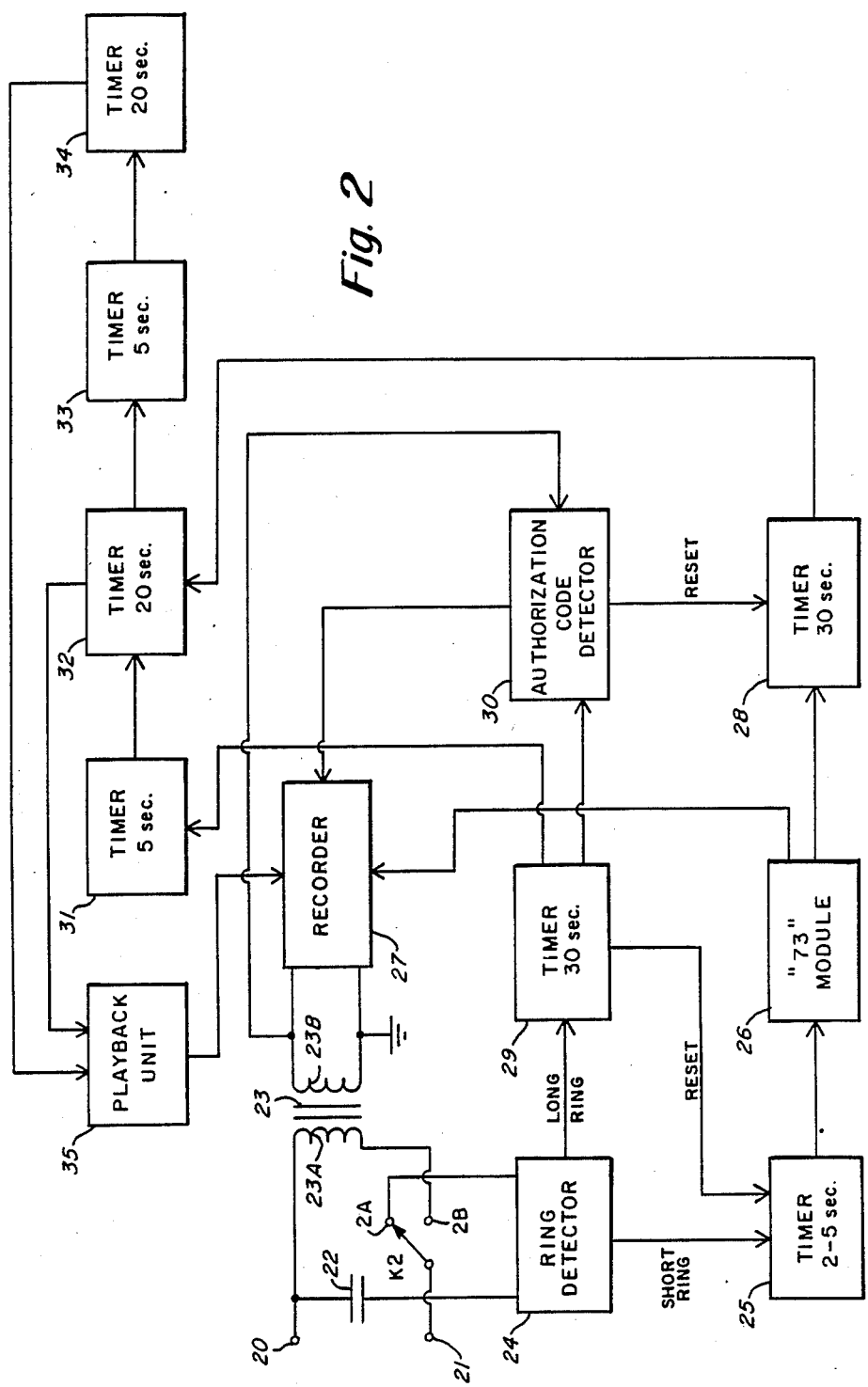

SINGLE LINE TELEPHONE CALL FORWARDING DEVICE

DISCLOSURE DOCUMENT CITATION

The invention here disclosed is the subject matter of Disclosure Document No. 116,581 which was filed on Apr. 18, 1983 in the U.S. Patent and Trademark Office and of Disclosure Document No. 116,953 which was filed on May 2, 1983 in that Office.

FIELD OF INVENTION

This invention relates in general to telephone systems and more particularly pertains to a device for use with the call forwarding service now provided by many telephone operating companies to their subscribers.

TELEPHONE CALL FORWARDING

Call forwarding is a service in which telephone calls placed to a subscriber's telephone number are diverted at the central station to another telephone number. The advantage of call forwarding is that incoming calls can be diverted to any other telephone number simply by instructing the central office to divert the calls to a designated telephone number. The instructions must, however, be given over the subscriber's telephone line for which the call forwarding service is provided. That is, call forwarding service is provided only for calls made to the subscriber's telephone line for which that service has been procured and all instructions to the central station for diverting those calls to another telephone number must be made over the subscriber's telephone line. For ease of reference, the subscriber's telephone line for which call forwarding service is provided is denominated "the procured service phone line".

Call forwarding service accommodates both pulse and tone signaling telephones. Assuming the subscriber's telephone is of the tone signaling type having a twelve button keypad, to program the system to forward calls, the number "72" is dialed. Upon receipt of the dial tone, the telephone number to which the calls are to be forwarded is dialed and ringing is heard. When the phone is answered, call forwarding to that telephone number is established. It is customary to inform the person answering the phone that calls will be forwarded to that telephone. In the event the phone to which calls are to be forwarded is busy or the ring is not answered, call forwarding can be established by hanging up the subscriber's phone and within 2 minutes again dialing "72", obtaining the dial tone, dialing the number to which calls are to be forwarded, and listening for two beep tones. Receipt of the two beep tones indicates that call forwarding has been established.

To cancel call forwarding, the subscriber's telephone is taken off-hook, "73" is dialed, and the receipt of two beep tones is awaited. Receipt of the two beep tones signifies that call forwarding has been cancelled.

In some systems the # signal is used to speed up service and in those systems the # signal may be dialed immediately after the dialing of "72" or "73".

CALL FORWARDING LIMITATION

The limitation on call forwarding which requires all forwarding and cancelling instructions to be given over the subscriber's procured service phone line provides a measure of security because only persons having access to that procured service phone line can alter or cancel the call forwarding instructions. However, that limitation is often inconvenient because call forwarding instructions heretofore could not be easily changed from a station remote from the subscriber's procured service telephone, as for example, when the subscriber moves from one remote location to another.

TWO LINE TELEPHONE CALL FORWARDING DEVICE

In my copending patent application Ser. No. 684,021, which was filed in the U.S. Patent Office on Dec. 20, 1984, a device is disclosed that enables call forwarding instructions to be given from any telephone in the system or in any connecting system. That device, however, requires connection to two telephone lines; one of those two phone lines is the subscriber's procured service phone line and the other telephone line is a "dedicated" line over which call forwarding instructions can be given from any remote location (i.e. from any location remote from the subscriber's procured service phone). The obvious drawback of the two telephone line device is that a second telephone line must be available to act as the "dedicated" line. In many instances, a second telephone line is not available or the subscriber is unwilling to pay for the installation of a second line or the subscriber is unwilling to pay the additional charges of the telephone operating company for providing service for a second line.

THE SHORT RING SIGNAL

It has been found that when a telephone call is forwarded, before or simultaneously with the diversion of the call to the programmed phone number, that a short ring signal of less than ½ second duration is transmitted by the central station to the subscriber's procured service phone line. In many instances the signal is so short that the subscriber's phone does not produce an audible ring. It has however, been established that each forwarded call results in the transmission of a short ring signal to the subscriber's procured service phone line. Consequently, the subscriber, when he is at a location remote from his procured service telephone, can communicate with that phone by signalling with the short ring signal. The invention here disclosed resides in the utilization of the short ring signal to eliminate the need for a "dedicated" second phone line to communicate with the call forwarding device.

OBJECTS OF THE INVENTION

The principal object of the invention is to provide a single telephone line device that can be connected to the subscriber's procured service phone line to enable call forwarding instructions to be given from any telephone in the system or in any connecting system.

Another object of the invention is to provide a single telephone line device for the subscriber's procured service phone line that enables call forwarding instructions to be given from any connecting telephone while insuring that instructions will be accepted only from authorized persons.

THE DRAWINGS

FIG. 2 is a block diagram showing the scheme of another embodiment of the invention.

DETAILED DESCRIPTION OF EMBODIMENTS OF THE INVENTION

Figure 1:
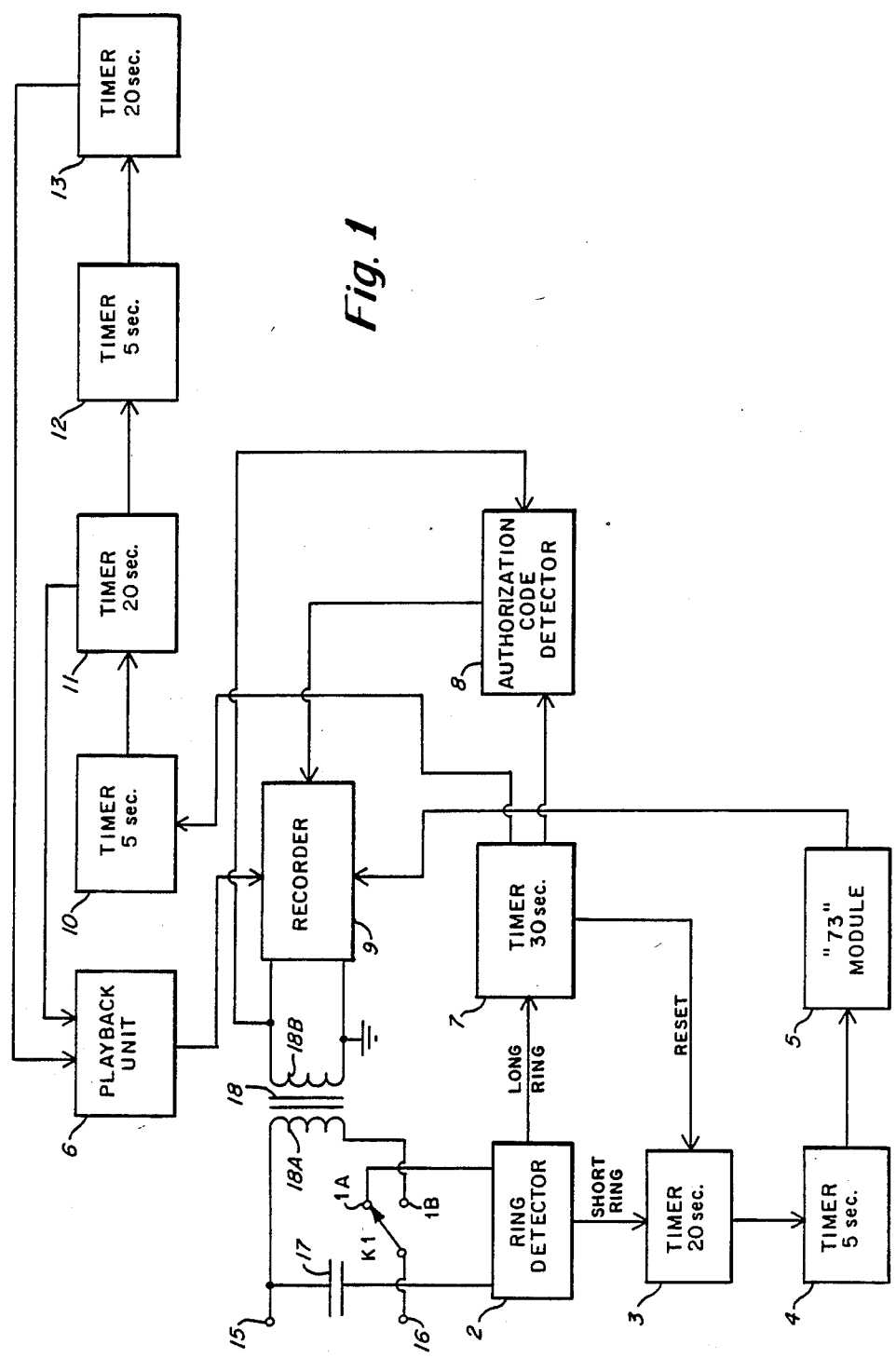
FIG. 1 is a block diagram illustrating the scheme of the preferred embodiment of the invention.

Referring now to FIG. 1 which shows the scheme of the preferred embodiment of the invention in block diagrammatic form, the ring and tip terminals 15 and 16 of the subscriber's procured service phone line are connected to a ring detector 2 that detects the presence of a ring signal on the telephone line. Terminal 15 is connected through a D.C. blocking capicitor 17 to the ring detector and terminal 16 is connected through the contact 1A of a relay K1 to that ring detector. The ring detector, for example, can be of the kind described in Optoelectronics/Fiber Optics Applications Manual, 2nd ed., McGraw-Hill, at page 3.71.

Where call forwarding service has been procured for the subscriber's telephone line and that line has been programmed to forward calls to some other telephone number, a ring signal of less than ½ second duration is transmitted over the subscriber's telephone line when a telephone call is made to the subscriber's telephone number. The short ring signal is transmitted to the subscriber's procured service phone line shortly before or simultaneously with the diversion of the phone call to the programmed number. The ring detector 2, in response to that short ring signal, emits an actuation signal to a timer 3 which thereupon starts upon a twenty second timing cycle. If another telephone call to the subscriber's phone is made within that 20 second interval, the ring detector, upon detecting the short ring signal, causes a timer 4 to start a five second timing cycle. At the end of the five second cycle, timer 4 emits a trigger signal to module 5. Upon being triggered, module 5 energizes the winding of relay K1, whereupon the armature of that relay moves from contact 1A to contact 1B and causes the telephone line to be seized by placing the winding 18A of audio transformer 18 across the telephone terminals. The module 5, after being triggered, causing the number "73" to be dialed out, either as pulses or as dual frequency tones, by the recorder 9. For that purpose, the module has a memory in which the number "73" is permanently recorded. Seven seconds after module 5 dials out number "73", the seized telephone line is released by the return of relay K1's armature to contact 1A upon the deenergization of that relay's winding. The module 5 may have a built-in seven second timer or may use an external timer with a seven second cycle.

Transmittal of number "73" over the telephone line causes the forwarding instructions to be cancelled so that a subsequent incoming call is directed, without diversion, to the subscriber's phone line. The next incoming telephone call, therefore, causes full length ring signals to be received at the subscriber's phone line. To reprogram the line for call forwarding, the subscriber, after having previously twice called his phone number within 20 seconds, then calls again. On that third call, ring detector 2 detects a full length ring signal. Because the full length ring signal is of longer than ½ second duration, ring detector 2 emits a triggering signal to timer 7, whereupon that device enters upon a 30 second timing cycle. At the beginning of that cycle, timer 7 emits a reset signal to timer 3 and also energizes the winding of relay K1 to cause seizure of the telephone line by the placing of transformer winding 18A across that line. After the line has been seized, the subscriber then enters a three or four digit "handshake" code. The "handshake" is a security measure to enable only authorized persons to give programming instructions to the device.

A code detector 8, upon receipt of the proper authorization code signals, places the recorder 9 in the mode to record from the telephone line and causes a short beep signal to be sent over that line to indicate that the device is ready to accept reprogramming instructions. To reprogram the call forwarding service, during the 30 second cycle of timer 7, number "72" is transmitted to the recorder followed by the number of the telephone to which calls are to be forwarded and the phone is then hung up. The timer 7, upon reaching the end of its cycle, emits a trigger signal to actuate timer 10 and concurrently deenergizes the winding of relay K1 whereupon the seized telephone line is released. Upon being actuated, timer 10 enters on a five second cycle and at the end of that cycle emits a signal that actuates timer 11. Timer 11, during a twenty second interval, energizes the winding of relay K1 to cause the telephone line to be seized and then causes the recorder 9 to play the recorded programming information over the seized telephone line. At the end of that timing period, timer 11 causes the phone line to be released and concurrently actuates a five second timer 12. Timer 12 runs to the end of its five second interval and then actuates timer 13. Upon actuation, timer 13 causes the telephone line to be seized by energizing the winding of relay K1 and also emits a playback signal to playback unit 6. The playback unit then causes recorder 9 to again transmit the programming information over the telephone line. After running to the end of its 20 second cycle, timer 13 releases the telephone line. The foregoing sequence of operation results in the cancellation of the initial call forwarding instructions and the subsequent reprogramming for causing calls to be forwarded to a different telephone number.

The recorder 9 may, for example, include a memory unit of the kind employed in telephones having a last number redial feature that enables the last dialed telephone number to be redialed merely by pressing a redial key on the telephone pad. In the schematic arrangement shown in FIG. 1, the playback unit performs the functions of the redial key and upon actuation causes the numbers recorded in the memory unit of the recorder to be converted either into pulses or dual frequency tones and played out over the telephone line. The authorization code detector 8 is arranged to prevent information from being entered in the memory unit of the recorder unless a proper authorization code is received by that detector. The recorder, upon receiving the number "73" output signals from memory module 5, converts those signals either into pulses or dual frequency tones and plays them out over the telephone line. The memory module 5, alternatively, may have its own converter. In that circumstance, the converter in the recorder need not be used and the module's output can then bypass the recorder and be applied directly to the winding 18B of the audio transformer.

FIG. 2 is a block diagram showing the scheme of an embodiment of the invention that requires only two successive telephone calls to reprogram the call forwarding service rather than the three successive calls required by the FIG. 1 embodiment. In FIG. 2, the ring and tip terminals of the subscribers procured service phone line are designated by numerals 20 and 21. A ring detector 24 is connected by D.C. blocking capacitor 22 to terminal 20 and that detector is connected to terminal 21 through contact 2A of a relay K2.

It is assumed that a telephone number to which calls are to be forwarded has been programmed into the recorder 27 and that the central station has been instructed to forward calls to the programmed number. In that condition, when a telephone call is made to the subscriber's procured service phone line, a short ring signal is transmitted that is detected by ring detector 24. The ring detector thereupon emits a trigger signal to timer 25 which causes that timer to commence a short timing cycle of 2 to 3 seconds duration. At the end of that cycle, the module 26 is activated by a signal from timer 25 and the module thereupon energizes the coil of relay K2, causing the armature of that relay to move from contact 2A to contact 2B. By that action, winding 23A of transformer 23 is placed across the terminals of the telephone line so that the line is seized. Following that seizure, module 26 causes number "73" to be dialed out on the seized line. The transmission of number "73" to the central station causes cancellation of call forwarding. After number "73" has been dialed out, module 26 emits a signal to timer 28 that causes that timer to begin a 30 second timing cycle and at approximately the same time, the module releases the seized phone line by deenergization of the coil of relay K2. If, within that 30 second interval, no other calls are made to the subscriber's phone, timer 28 runs to the end of its cycle. At the end of that 30 second cycle, timer 28 emits a trigger signal to timer 32. Timer 32 thereupon causes the telephone line to be seized and then emits a signal to playback unit 35 that causes recorder 27 to play out the number "72", followed by the programmed telephone number to which calls are to be diverted. At the conclusion of the 20 second cycle, timer 32 releases the seized phone line and triggers timer 33 into actuation. Timer 33 runs to the end of a five second cycle and then emits a signal that actuates timer 34. Upon being actuated, timer 34 causes the phone line to be seized by energizing the coil of relay K2 and then actuates playback unit 35. The playback unit thereupon causes the recorder to repeat the play out of number "72" and the programmed telephone number. That procedure causes call forwarding to be again established.

If, within the thirty second cycle of timer 28 a call is made to the subscriber's phone line, ring detector 24 detects the long ring signal and emits a trigger signal to timer 29 that starts the timer on a 30 second timing cycle. Timer 29, at the start of its cycle, causes timer 25 to be reset and seizes the phone line by energizing the coil of relay K2. If the proper authorization code is transmitted to code detector 30 before timer 28 completes its cycle, the operation of timer 28 is arrested by a reset signal from the code detector. Otherwise, timer 28 runs to the end of its cycle and emits a signal that actuates timer 32. Where the proper authorization code is transmitted, code detector 30 enables the recorder 27 to accept and store information from the phone line. Assuming that information is the number "72" followed by a telephone number, it is stored in the memory unit of the recorder. After timer 29 has run to the end of its thirty second cycle, it releases the seized phone line and triggers the timer 31. Timers 31, 32, 33 and 34 are the counterparts of timers 10, 11, 12, and 13 in the FIG. 1 embodiment and their operation is identical to that of those FIG. 1 timers. Consequently, call forwarding is reprogrammed to divert calls to the phone number stored in the memory unit of the recorder. If that number was not preceded by a "72", call forwarding is cancelled and all subsequent calls are then transmitted to the subscriber's procured service phone line.

In the FIG. 2 embodiment, the device cancelled call forwarding whenever a call was made to the subscriber's procured service telephone line even though the call was diverted to some other phone line and if a second call was not made within 30 seconds to reprogram the stored number, the device reestablished call forwarding to the old number stored in the recorder. Consequently, the device is arranged to perform a sequence of operations that cancels and reestablishes call forwarding to the old number each time a call is made that does not reprogram the stored number. To avoid that mode of operation, the device can be modified to perform a different sequence of operations. In the modified sequence, whenever a call is made that is forwarded to another telephone number, the device detects the short ring and actuates timer 25. After that timer runs through a cycle of about 4 or 5 seconds, it emits a signal that causes the device to dial the number of the phone to which calls are forwarded. If that number is busy, the device detects the busy signal and then releases the phone line without cancelling call forwarding. The busy signal signifies that the diverted call has been answered and consequently was not intended as a signal to communicate with the device inasmuch as if the call was intended as a communication signal, the caller would have immediately hung up the phone on hearing the first one or two rings. In the event a busy signal is not received at the device, the device causes call forwarding to be cancelled by dialing out "73" and then releases the phone line. If another call is not received at the device within a preset time period after cancellation of call forwarding, the device then reestablishes call forwarding to the old phone number.

Obviously, modifications that do not depart from the essential aspects of the invention can be made in the embodiments that have been here described. It is, for example, evident that the duration of the timing cycles can be changed or that the timing functions of the various timers can be provided by a single timing signal source.

In view of the obvious changes that can be made, it is intended that the invention not be restricted to the precise embodiments here described. Rather, it is intended that the scope of the invention be construed in accordance with the appended claims, having regard for the substitution of equivalents that are obvious to those skilled in the telephone and electronics arts.

I claim:

1. A single telephone line call forwarding device comprising:
   (i) a ring detector for detecting long and short ring signals,
   (ii) connection means for connecting the ring detector to the procured service phone line, the connection means having a switch for causing seizure of the procured service phone line, and
   (iii) first means adapted to be activated by an output signal resulting from the detection by the ring detector of a short ring, the first means, when activated, causing seizure of the procured service phone line and effecting dialing out on the seized phone line of signals that cause cancellation of call forwarding, and thereafter causing release of the seized phone line.

2. The single telephone line call forwarding device according to claim 1, further comprising (iv) a first timer responsive to an output signal from the ring detector resulting from the detection by the ring detector of a long ring signal, the first timer causing seizure of the procured service phone line for the duration of the timing cycle of the first timer.

3. The single telephone line call forwarding device according to claim 2, further comprising
(v) a recorder for storing information received over the procured service phone line, the recorder being coupled to that phone line when that line is seized.

4. The signal telephone line call forwarding device according to claim 3, further comprising
(vi) an authorization code detector, the authorization code detector enabling the recorder to accept signals from the procured service phone line only after the detection of an authorization code by the authorization code detector.

5. The single telephone line call forwarding device according to claim 4, further including
(vii) playback means adapted to respond to an output signal from the first timer, the playback means, upon being actuated by a signal, causing the procured service phone line to be seized and causing the recorder to dial out signals corresponding to the stored information, the playback means then causing the phone line to be released and subsequently causing the phone line to be reseized within a preset time and causing dialing out again of the same signals.

6. The single telephone line call forwarding device according to claim 5, further comprising
(viii) a second timer coupled to the first means and commencing its timing cycle in response to a start signal from the first means, the second timer causing the playback means to be actuated at the end of the timing cycle of the second timer.

7. The single telephone line call forwarding device according to claim 6, wherein
the authorization code detector emits a reset signal to the second timer upon detection of the proper authorization code within the timing cycle of the second timer.

* * * * *